(12) United States Patent
Zielinski et al.

(10) Patent No.: US 8,225,671 B2
(45) Date of Patent: Jul. 24, 2012

(54) APPARATUS AND METHOD FOR NON-CONTACTING BLADE OSCILLATION MEASUREMENT

(75) Inventors: Michael Zielinski, Unterschleissheim (DE); Gerhard Ziller, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 442 days.

(21) Appl. No.: 12/520,453

(22) PCT Filed: Dec. 12, 2007

(86) PCT No.: PCT/DE2007/002244
§ 371 (c)(1),
(2), (4) Date: Jun. 19, 2009

(87) PCT Pub. No.: WO2008/074300
PCT Pub. Date: Jun. 26, 2008

(65) Prior Publication Data
US 2010/0089166 A1    Apr. 15, 2010

(30) Foreign Application Priority Data
Dec. 21, 2006   (DE) .......................... 10 2006 060 650

(51) Int. Cl.
*G01H 1/00* (2006.01)
(52) U.S. Cl. ............................................ 73/660; 73/602
(58) Field of Classification Search .................... 73/660, 73/579, 583, 597, 602, 632, 649; 702/115, 702/183
See application file for complete search history.

(56) References Cited

U.S. PATENT DOCUMENTS

| | | | |
|---|---|---|---|
| 4,049,644 A * | 9/1977 | Wennerstrom | 250/233 |
| 4,410,806 A * | 10/1983 | Brulle | 290/44 |
| 4,413,519 A * | 11/1983 | Bannister et al. | 73/660 |
| 4,518,917 A | 5/1985 | Oates et al. | |
| 4,573,358 A * | 3/1986 | Luongo | 73/660 |
| 4,790,189 A | 12/1988 | Twerdochlib | |
| 4,955,269 A * | 9/1990 | Kendig et al. | 73/577 |
| 5,152,172 A * | 10/1992 | Leon et al. | 73/579 |

(Continued)

FOREIGN PATENT DOCUMENTS

JP    60240803 A   * 11/1985

(Continued)

OTHER PUBLICATIONS

Zielinski, M. et al., "Noncontact Blade Vibration Measurement System for Aero Engine Application", 17th International Symposium on Airbreathing Engines, 2005, ISABE-2005-1220, Jan. 1, 2005, pp. 1-9.

(Continued)

*Primary Examiner* — Hezron E Williams
*Assistant Examiner* — Samir M Shah
(74) *Attorney, Agent, or Firm* — Crowell & Moring LLP

(57) ABSTRACT

An apparatus and method for non-contact blade vibration measurement is disclosed. The apparatus and method includes sensors which are arranged around the circumference of a rotor which is formed with rotor blades, a signal detection unit, and an evaluation unit. Devices are provided to determine the rotor position and/or the housing deformation. This avoids the technical problems of the prior art, and provides an improved apparatus and an improved method for non-contact blade vibration measurement. In particular, the attainment according to the invention eliminates the effect of rotor radial movements and housing deformations, i.e., oval deformations, on the measurement data, thereby ensuring high amplitude resolution for the vibration analysis under all conditions.

4 Claims, 2 Drawing Sheets

U.S. PATENT DOCUMENTS

| | | | |
|---|---|---|---|
| 6,584,849 B2 * | 7/2003 | Loftus et al. | 73/659 |
| 6,594,619 B1 * | 7/2003 | von Flotow | 702/184 |
| 6,679,121 B2 * | 1/2004 | Sonnichsen et al. | 73/660 |
| 6,785,635 B2 * | 8/2004 | von Flotow | 702/184 |
| 7,023,205 B1 * | 4/2006 | Krupp | 324/239 |
| 7,104,120 B2 * | 9/2006 | Gladden | 73/114.77 |
| 7,162,384 B1 * | 1/2007 | Browning et al. | 702/99 |
| 7,323,868 B2 * | 1/2008 | Mishkevich et al. | 324/239 |
| 7,324,908 B2 * | 1/2008 | Browning et al. | 702/99 |
| 7,333,913 B2 * | 2/2008 | Andarawis et al. | 702/158 |
| 7,631,498 B2 * | 12/2009 | Greentree | 60/605.1 |
| 7,836,772 B2 * | 11/2010 | Twerdochlib | 73/661 |
| 7,987,725 B2 * | 8/2011 | Twerdochlib | 73/661 |
| 2002/0083772 A1 * | 7/2002 | Sonnichsen et al. | 73/660 |
| 2002/0162394 A1 * | 11/2002 | Loftus et al. | 73/593 |
| 2003/0060986 A1 * | 3/2003 | Flotow | 702/36 |
| 2009/0078051 A1 * | 3/2009 | Twerdochlib et al. | 73/660 |
| 2009/0078053 A1 * | 3/2009 | Twerdochlib | 73/661 |

FOREIGN PATENT DOCUMENTS

JP     2010276438 A   *   12/2010

OTHER PUBLICATIONS

Von Flotow, A, et al., "Health Monitoring and Prognostics of Blades and Disks with Blade Tip Sensors", Aerospace Conference Proceedings, 2000 IEEE Mar. 18-25, 2000, Piscataway, NJ, USA, IEEE, pp. 433-440.

* cited by examiner

APPARATUS AND METHOD FOR NON-CONTACTING BLADE OSCILLATION MEASUREMENT

This application claims the priority of International Application No. PCT/DE2007/002244, filed Dec. 12, 2007, and German Patent Document No. 10 2006 060 650.7, filed Dec. 21, 2006, the disclosures of which are expressly incorporated by reference herein.

BACKGROUND AND SUMMARY OF THE INVENTION

The invention relates to an apparatus for non-contact blade vibration measurement having sensors which are arranged around the circumference of a rotor which is formed with rotor blades, having a signal detection unit and having an evaluation unit, as well as a method for non-contact blade vibration measurement.

Basically, non-contact blade vibration measurement [berührungslose Schaufelschwingungsmessung (BSSM)] on rotor blades of axial compressors of gas turbines for aircraft propulsion or for stationary industrial gas turbines is known from the prior art in the international arena under the name of tip timing. These measurements are required because great static and alternating aerodynamic forces are acting on the blade during operation, which excite the blade to vibrate. Among other things, the pressure distribution in the gas flow because of the intake geometry, changes in the clearance between the blade tips and the housing caused by oval deformations of the housing, or the stator grille can be responsible for this. These sources of vibration are linked to the engine housing, and therefore generate vibrations with multiples of the rotational speed of the rotor shaft, so-called resonant vibrations. Other types of vibrations are triggered by aerodynamic instabilities, and flutter vibrations and vibrations with compressor pumps belong in this category.

Strong vibrations may lead to the formation of cracks in the compressor blades and ultimately to the failure of blades, which can bring about the total failure of a turbine engine. This can have fatal consequences, particularly in the case of components for air traffic.

As a result, blade vibration measurements are conducted during the development of these types of engines. Corresponding measurements in series production engines are just as possible in principle. In the case of older known measuring methods, the blade vibrations are monitored by means of strain gauges and telemetry transmission, i.e., not in a non-contacting manner. However, this is associated with increased equipment expenses and corresponding costs, which is why the non-contact measuring methods are preferred.

Non-contact blade vibration measurement systems are therefore used to monitor blade vibrations in compressors on the blade tips and are able to reliably predict the service life of the rotor blades, wherein the method can, to some extent, also simultaneously measure the radial clearance between the blade tips and the housing. Different measuring systems are known in this case.

A known measuring system for non-contact blade vibration measurement uses, for example, capacitive sensors in the engine housing to measure both the vibrations as well as the radial clearance on the rotor blades of axial compressors. In this case, the sensors used can be deployed in a temperature range of up to approx. 700° C., which makes use on all compressor stages possible. The basic principle of the vibration measurement is a run-time measurement of the blade tips passing under the sensors. In the process, vibrating blades pass by the sensors sooner or later depending on the momentary deflection state. The clearance information in this measuring method comes from the variation of the signal amplitude, when a blade approaches a sensor and passes under it. The vibration frequencies, vibration amplitudes, and radial clearances of all rotor blades of a rotor stage can be determined and analyzed by analyzing the passing times and the amplitude swing.

For the vibration measurement, the precise positions of the sensors on the circumference of the housing must be known, something that can be accomplished in an idle state by simply taking measurements of the respective sensor position. However, radial movements of the rotor axis relative to the housing axis and to housing deformations occur when the engine is in operation. The causes of this, among other things, are the effects of gravity, asymmetric conditions at the engine intake or thermal effects, such as those that are triggered when opening and closing bleed valves, for example. These types of effects lead to changes in the effective sensor positions as viewed from the rotor and therefore to interference or mistakes in the vibration analysis. This is particularly the case when analyzing resonant vibrations of higher lying vibration modes, which generate only small deflections on the blade tip. At the latest, when the displacement of the effective sensor position reaches the order of magnitude of the vibration deflection being measured, a precise measurement of the vibration amplitude is only possible with great difficulty or not at all.

The effect of the described interference is critical, above all, for resonant vibrations, because in this case, at a specific rotational speed, the rotor blades pass by the sensors during each rotation in the same deflection state, because the vibration movement is bound in terms of phase to the engine housing.

These effects are not taken into consideration with known tip-timing systems. Resonant vibrations are evaluated as a rule rotationally. The cited interference, i.e., the movement of the rotor axis relative to the housing axis and the housing deformation, i.e., in particular the oval deformations, are superimposed, however, on the measurement data that is obtained in this manner and restrict the amplitude resolution or the measuring accuracy accordingly.

In some cases, the so obtained measurement data of a complete resonance pass are analyzed jointly by resonance curve fit. Fit parameters are amplitude and frequency at the resonance point, as well as other parameters.

This largely eliminates the effect in the range of the resonance of constant offsets on the angle positions of the sensors, but when there is a sudden change in the resonance in the rotor position or the housing shape, such as can occur, for example, by opening or closing the bleed valves, this appears as interference or an error in the measurement data.

As a result, the invention is based on the objective of avoiding the technical problems of the prior art that was cited above, and providing an improved apparatus and an improved method for non-contact blade vibration measurement. In particular, one objective of the present invention is eliminating the effect of rotor radial movements and housing deformations, the so-called oval deformations, on the measurement data, thereby ensuring high amplitude resolution for the vibration analysis under all conditions.

The invention avoids the technical problems of the prior art and provides an improved apparatus and an improved method for non-contact blade vibration measurement. In particular, the inventive attainment eliminates the effect of rotor radial movements and housing deformations, i.e., oval deformations, on the measurement data, thereby ensuring high amplitude resolution for the vibration analysis under all conditions.

The inventive apparatus for non-contact blade vibration measurement having preferably capacitive sensors which are arranged around the circumference of a rotor which is formed with rotor blades, having a signal detection unit, and having an evaluation unit is characterized in that the apparatus features devices to determine the rotor position and/or the housing deformation, i.e., the oval deformations. The devices to determine the rotor position and/or the housing deformation may be formed advantageously both as hardware components or as software components. In this case, it is especially advantageous if the characteristic of the existing sensors for clearance measurement is utilized for the non-contact blade vibration measurement sensors and the corresponding measuring results are used to determine the rotor position and/or the housing deformation. This represents a simple and cost-effective solution. Alternatively, additional position sensors could also be used for determining the shaft position or the sensor position on the housing.

In order to calculate the rotor position, at least three sensors for clearance measurement must be arranged on the housing in a distributed manner over the circumference. In order to calculate the rotor position and housing deformation, i.e., for the so-called oval deformations, at least five or more sensors should be available. If it is possible to specify a main direction of the oval deformations, for example, due to the type of engine mount, it is also possible to work with only four sensors and, despite this, calculate the extent of the ovality. Alternatively, it is possible to calculate an ovalization with only four sensors under the assumption of an overall minimal deformation of the housing.

The inventive method for non-contact blade vibration measurement having sensors which are arranged around the circumference of a rotor which is formed with rotor blades, and having a signal detection unit, and having an evaluation unit features the following steps:

a) Detecting the sensor signals, in particular by means of the signal detection unit, in the evaluation unit;

b) Analyzing the passing time and the amplitude swing;

c) Analyzing the radial clearance;

d) Calculating the rotor position and, if applicable, the housing oval deformation on the basis of the radial clearance at the respective sensor position;

e) Calculating the effective sensor positions for the rotor; and f) Analyzing the vibrations on the basis of the effective sensor positions.

In the case of the inventive method, the sensor signals, for example, are read directly into an evaluation unit via a signal detection card, which converts the analog measuring signals into digital signals, and analyzed there with respect to the passing time and amplitude by means of appropriate hardware and/or software. Afterwards, the analysis regarding the radial clearance and vibrations of the rotor blades takes place.

Using the evaluation software, it is possible to continuously calculate the position of the rotor axis and deformation of the housing from the radial clearances, which are present at each sensor position. The sensor positions effective for the rotor can be calculated from these data. And from these, correction valves for the nominal positions of the sensors may in turn be determined. These corrections or this "tracking" of the sensors take place in the same time period as the vibration analysis, so that the sensor positions can be tracked point for point via the time or via the rotational speed. As a result, the interference from the movement of the rotor axis relative to the housing axis and from the housing deformation can be eliminated.

Because of these inventive measures, the amplitude resolution can be substantially improved in the analysis of resonant vibrations. In particular, in the case of the real-time analysis, vibration amplitudes should be indicated immediately and even in the case of a constant rotational speed, which is why a resonance curve fit known from the prior art is not possible.

BRIEF DESCRIPTION OF THE DRAWINGS

Additional measures improving the invention are explained in greater detail in the following, together with the description of a preferred exemplary embodiment of the invention on the basis of the figures. The drawings show.

DETAILED DESCRIPTION OF THE DRAWINGS

Figure 1:
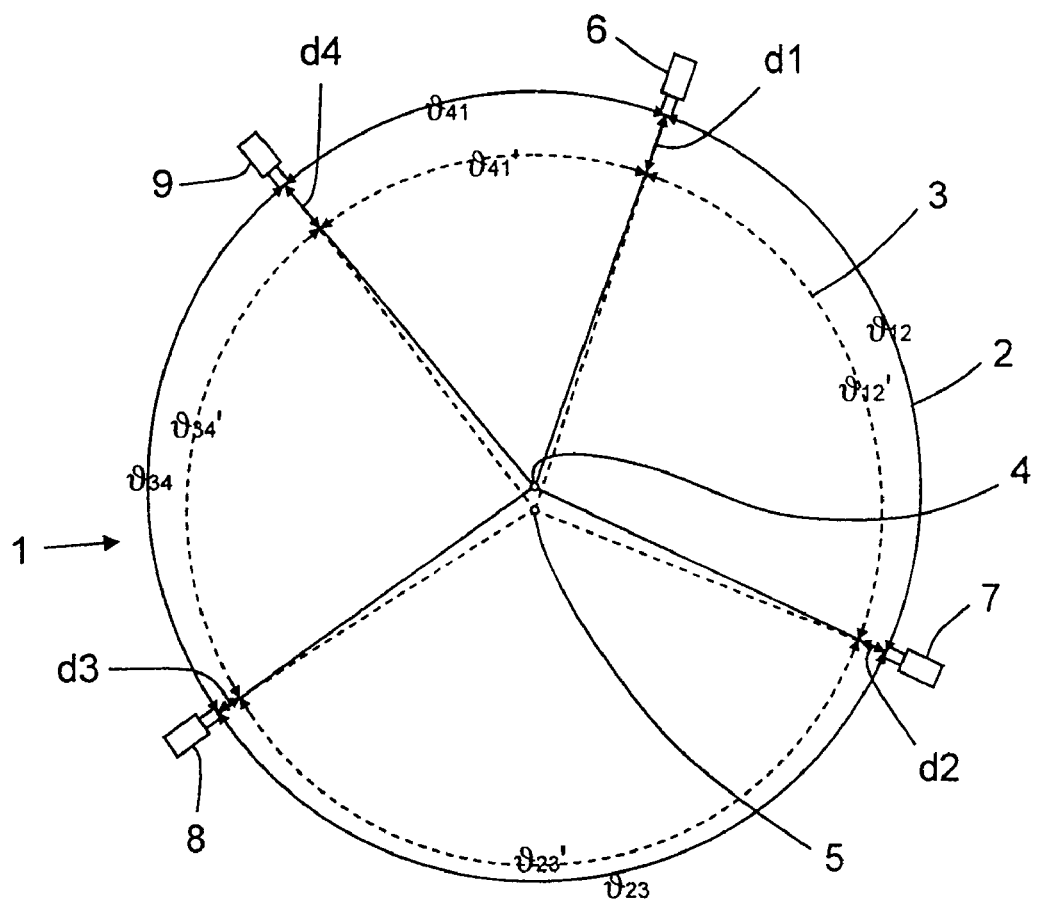
FIG. 1 is a schematic representation of the tracking of the effective sensor position with a non-contact blade vibration measurement.

The schematic sectional representation according to FIG. 1 shows the tracking of the effective sensor position in the case of non-contact blade vibration measurement via an integrated radial clearance analysis according to the present invention.

In this connection, four capacitive sensors 6, 7, 8, 9 are arranged in a distributed manner over the circumference of the compressor housing 2. The sensors 6, 7, 8, 9 are mounted, for example, by being screwed into corresponding threaded boreholes in the housing jacket.

Moreover, FIG. 1 shows the housing axis 4 situated in the center of the compressor housing 2 and the rotor axis 5. The two axes 4, 5 are not aligned in the present exemplary embodiment and consequently are offset from each other. The circumference of the rotor 3 that is equipped with rotor blades is indicated by the dashed circle line within the housing 2.

The first sensor 6 in this case is used to measure the clearance d1 between the interior wall of the housing 2 and the blade tips of the rotor blades of the rotor 3. The second sensor 7 is used to measure the clearance d2, the third sensor 8 is used to measure the clearance d3, and the fourth sensor 9 is used to measure the clearance d4 between the interior wall of the housing 2 and the blade tips of the rotor blades of the rotor 3. In this case, it is evident that the clearance widths d1, d2, d3, d4 are not all equal. As a result, just because of the clearance measurement, an eccentricity can be established which, in the present case, can be attributed to the offset position of the rotor axis.

There is a circular arc segment $v12$ between the first sensor 6 and the second sensor 7 on the housing circumference. In this process, the first sensor 6 determines the blade tip clearance d1 and the second sensor 7 determines the blade tip distance d2. The circular arc segment $v12'$ of the corresponding blade tips is determined from these clearance measurements, which is depicted in FIG. 1 as a dashed line.

The corresponding circular arc segments $v23'$, $v34'$, and $v41'$ are determined in the same way in relation to the corresponding sensor positions 7, 8, 9, 6.

This allows the displacement of the rotor axis 5 to be calculated as the center of the circle formed by the circular arc segments $v12'$, $v23'$, $v34'$, and $v41'$. The radii of the circle, which is formed in this manner, lead to the rotor axis 5 and are depicted in FIG. 1 as dashed lines. The sensor position of the first sensor 6, the second sensor 7, the third sensor 8, and the fourth sensor 9 can be provided by this with a correction value, and be "tracked" as it were. By using corresponding algorithms, the housing deformation or the ovalization can even be calculated with only four sensors 6, 7, 8, 9.

Figure 2:
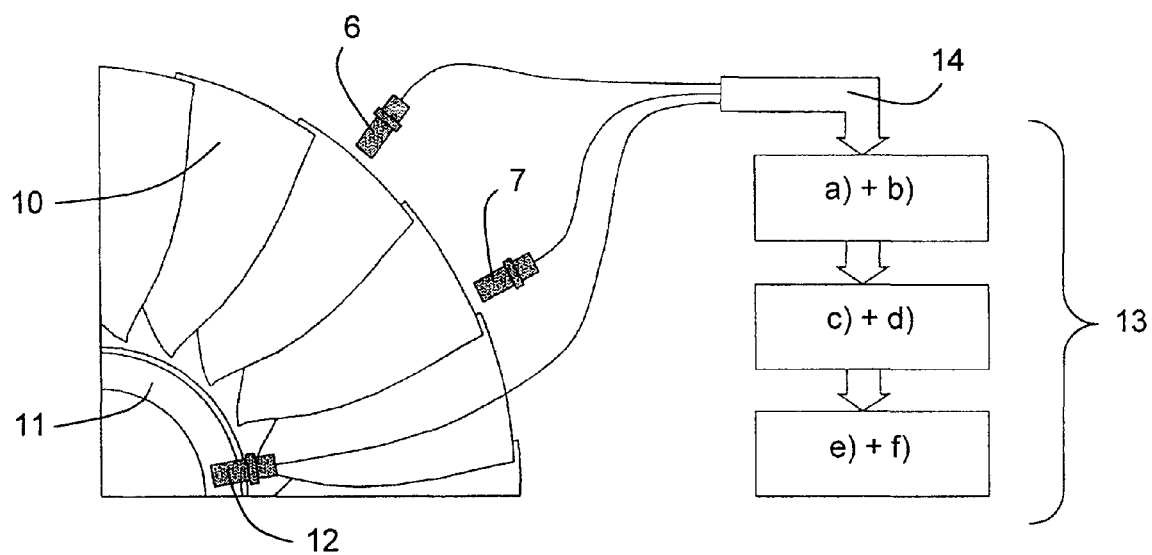
FIG. 2 is a schematic representation of the basic principle of the non-contact blade vibration measurement in accordance with the present invention.

FIG. 2 depicts a schematic representation of the basic principle of non-contact blade vibration measurement according to the present invention, wherein only one fourth of the rotor disk 11 equipped with rotor blades 10 is depicted in FIG. 2.

A rotational sensor 12, which can be used to compare the calculated values, is provided on the rotor disk 11. The capacitive sensors 6, 7 are connected to the evaluation unit 13 via a data cable and a signal detection unit as indicated in FIG. 2.

The measuring signals of the sensors 6, 7, and 12 are fed into the evaluation unit 13 via a signal detection unit (e.g., an analog/digital converter) 14, and run through corresponding calculation steps there. The evaluation unit 13 in this case can be embodied as a standard computer equipped with special hardware or with special software. In this connection, it is advantageous if the evaluation unit possesses the ability to process the measurement data in real time.

FIG. 2 schematically depicts the individual procedural steps, which are executed in the evaluation unit in accordance with the present invention, as a type of flow chart.

In the depicted flow chart, first in processing step a) the sensor signals that have been digitized by the analog/digital converter are detected in the evaluation unit, and in processing step b) the passing time and the amplitude swing are analyzed.

Then, in processing step c) the radial clearance is analyzed, and in processing step d) the rotor position is calculated and (with an appropriate number of sensors) the housing ovality is calculated on the basis of the radial clearance measurements at the respective sensor positions, as already stated as an example in FIG. 1.

Finally, in processing step e) the effective sensor position for the rotor is calculated, i.e., the sensor position is arithmetically "tracked." Based on these positions, the blade vibrations are analyzed in processing step f).

The invention claimed is:

1. A method for non-contact blade vibration measurement with sensors which are arranged around a circumference of a rotor which is formed with rotor blades, a signal detection unit, and an evaluation unit, comprising the steps of:
   a) detecting sensor signals by the signal detection unit in the evaluation unit;
   b) analyzing a passing time and an amplitude swing;
   c) analyzing a radial clearance;
   d) calculating a rotor position on a basis of the radial clearance at respective sensor positions;
   e) calculating effective sensor positions for the rotor; and
   f) analyzing vibrations on a basis of the effective sensor positions.

2. The method for non-contact blade vibration measurement according to claim 1, wherein according to Step d), additionally a step of calculating a deformation of a housing is performed.

3. The method for non-contact blade vibration measurement according to claim 2, wherein the steps of calculating the rotor position and/or calculating the deformation of the housing occur in a same time period as the step of analyzing vibrations.

4. The method for non-contact blade vibration measurement according to claim 1, wherein according to Step e), additionally a step of calculating a correction value for a nominal position of the sensors is performed.

* * * * *